(12) United States Patent
Huang-Tsai

(10) Patent No.: US 8,070,195 B2
(45) Date of Patent: Dec. 6, 2011

(54) RADIATOR GRILLE OF AN AUTOMOBILE

(76) Inventor: Li-Yueh Huang-Tsai, Tainan (TW)

( * ) Notice: Subject to any disclaimer, the term of this patent is extended or adjusted under 35 U.S.C. 154(b) by 25 days.

(21) Appl. No.: 12/631,873

(22) Filed: Dec. 7, 2009

(65) Prior Publication Data

US 2011/0133498 A1   Jun. 9, 2011

(51) Int. Cl.
*B60R 19/52* (2006.01)
(52) U.S. Cl. ..................... 293/115; 296/193.1
(58) Field of Classification Search ............ 24/289, 24/293, 294, 295; 293/115; 296/180.1, 181.2, 296/193.1, 193.09; 301/37.24; 180/68.1, 180/68.6; 454/347
See application file for complete search history.

(56) References Cited

U.S. PATENT DOCUMENTS

| 3,858,370 | A | * | 1/1975 | Halstead ................. 312/352 |
| 4,427,238 | A | * | 1/1984 | Connell ................. 301/37.42 |
| 5,347,690 | A | * | 9/1994 | Mansoor et al. ............. 24/295 |

* cited by examiner

*Primary Examiner* — Dennis Pedder
*Assistant Examiner* — Jason S Daniels

(57) ABSTRACT

A radiator grille of an automobile includes a plastic main grille provided with plural air vents and plural positioning bases formed in the inside. Each of the positioning bases has a plugging groove for being inserted with a hooking member, which is made of metal with a locking portion located at one end, a blocking portion elastically extended outward, and a hunched positioning portion formed outwardly. So, with the hooking members made of metal to possess a strong strength and elasticity, they are not to be easily broken owing to improper operation while being assembled with the main grille. Moreover, the radiator grille can not only be conveniently and swiftly assembled, but also firmly positioned in a car.

1 Claim, 6 Drawing Sheets

RADIATOR GRILLE OF AN AUTOMOBILE

BACKGROUND OF THE INVENTION

1. Field of the Invention

This invention relates to a radiator grille of an automobile, particularly to one possessing a strong strength so that it is not apt to be broken and is conveniently and quickly assembled to be firmly positioned in a car.

2. Description of the Prior Art

Commonly, as shown in FIGS. 1 and 2, a conventional radiator grille 1 of an automobile is made of plastics, provided with a plurality of air vents 10, a plurality of hooking members 11 integrally formed in the inside, and a blocking portion 12 located at an end of each of the hooking members 11. In assembling, the radiator grille 1 is installed inside an opening 14 of a car body 13, with the blocking portion 12 of the hooking members 11 locked on the inner wall of the opening 14 to get positioned, so that the radiator grille 1 is stably fitted in the car body 13. However, as the radiator grille 1 and the hooking members 11 are integrally made of plastics, the hooking members 11 are apt to be broken in case that they are pressed with somewhat large force while being assembled, causing the blocking portion 12 of the hooking members 11 unable to lock with the car body 13 to downgrade the whole positioning effect.

SUMMARY OF THE INVENTION

The object of this invention is to offer a robust radiator grille of an automobile, which is not only uneasy to be broken, but also convenient for assembling.

The main characteristics of the invention are a grille body and plural hooking members. The grille body is made of plastics, provided with plural air vents and plural positioning bases formed in the inside. Each of the positioning bases has a plugging groove for being correspondingly inserted with a hooking member, which is made of metal with a locking portion located at one end, an elastic blocking portion extended outward, and a hunched positioning portion formed outwardly.

BRIEF DESCRIPTION OF DRAWINGS

This invention is better understood by referring to the accompanying drawings, wherein.

DETAILED DESCRIPTION OF THE PREFERRED EMBODIMENT

Figure 1:
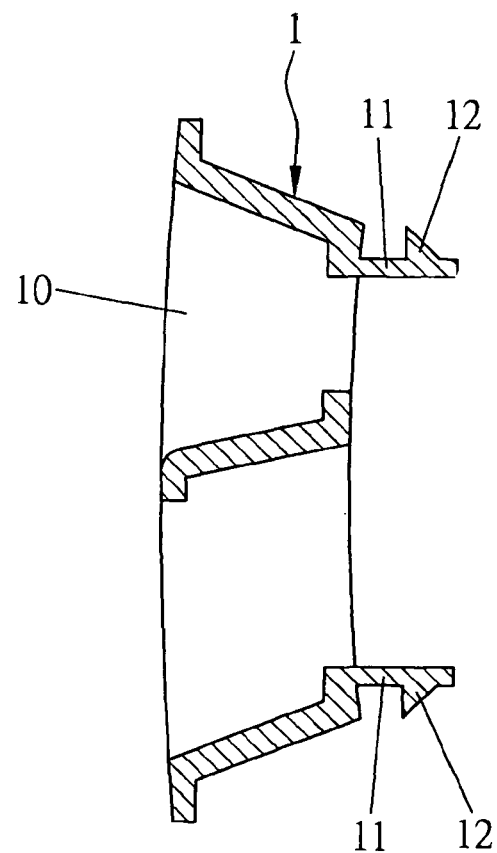
FIG. 1 is a cross-sectional view of a conventional radiator grille of an automobile.
Figure 2:
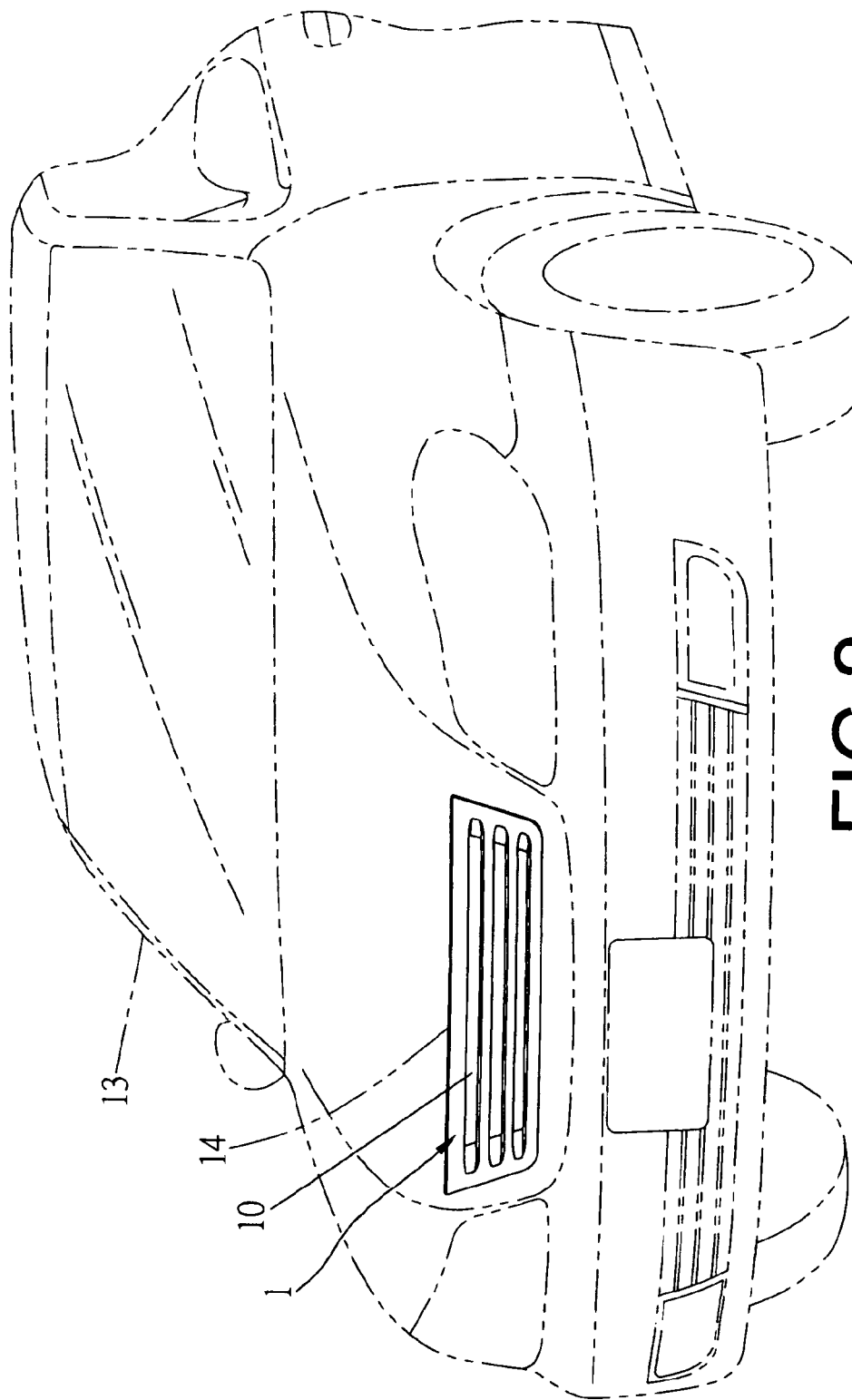
FIG. 2 is a front view of the conventional radiator grille of an automobile, showing it being installed in a car.
Figure 3:
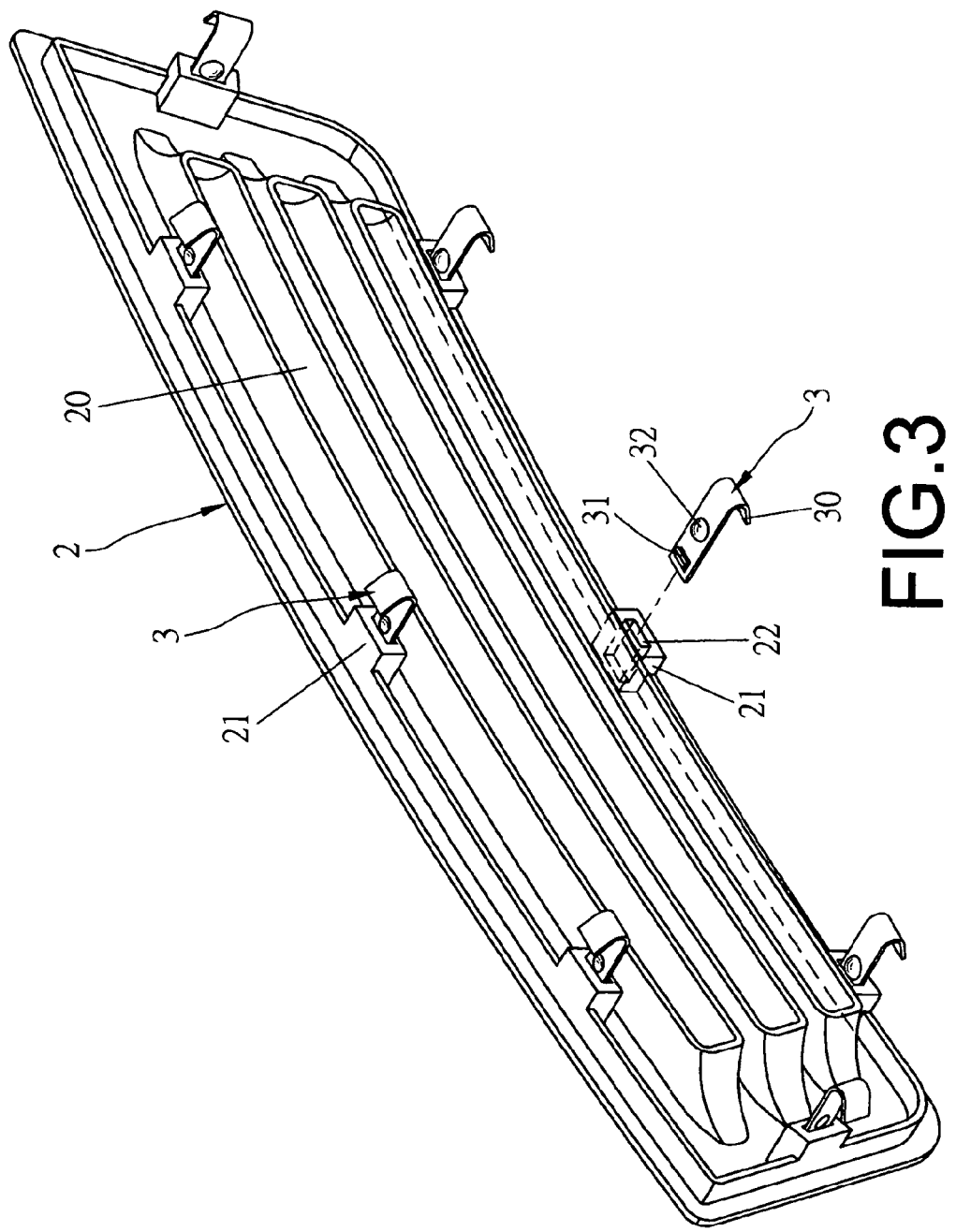
FIG. 3 is an exploded perspective view of a preferred embodiment of a radiator grille of an automobile in the present invention.

As shown in FIG. 3, a preferred embodiment of a radiator grille in the present invention is made of plastics, provided with a grille body 2 and plural hooking members 3.

The grille body 2 is provided with plural air vents 20, plural positioning bases 21 located on the inside, and a plugging groove 22 formed in each of the positioning bases 21 for being inserted by the hooking members 3.

Each of the hooking members 3 is made of metal, provided with a locking portion 30 formed at one end, an elastic blocking portion 31 obliquely pressed outward, and a hunched positioning portion 32 protruding outwards as well.

Figure 4:
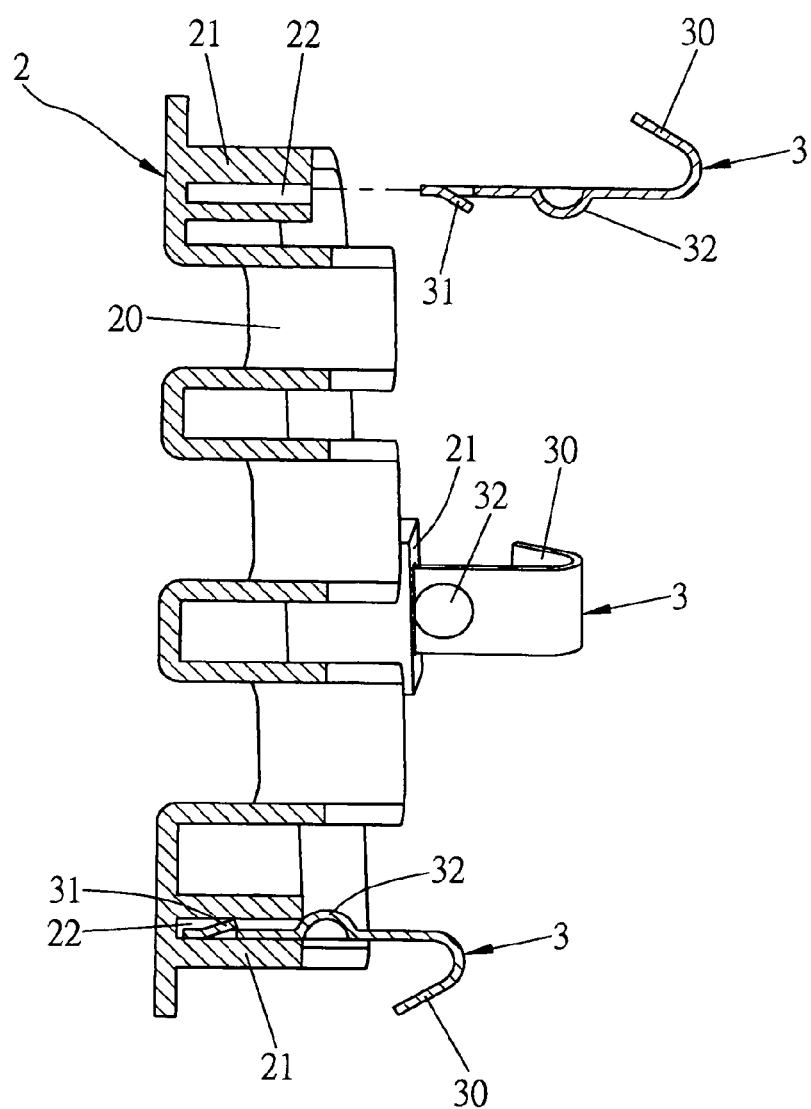
FIG. 4 is cross-sectional view of the preferred embodiment of a radiator grille of an automobile in the present invention, showing how it is to be assembled.

In assembling, as shown in FIG. 4, the hooking members 3 are first respectively inserted into the plugging grooves 22 of the grille body 2, with the blocking portion 31 elastically squeezing on the inner wall of the plugging groove 22 and the hunched positioning portion 32 leaning on the top of the positioning base 21. The hooking members 3 are thus fixedly positioned with the positioning bases 21 of the grille body 2, finishing the assembly of the radiator grille.

Figure 5:
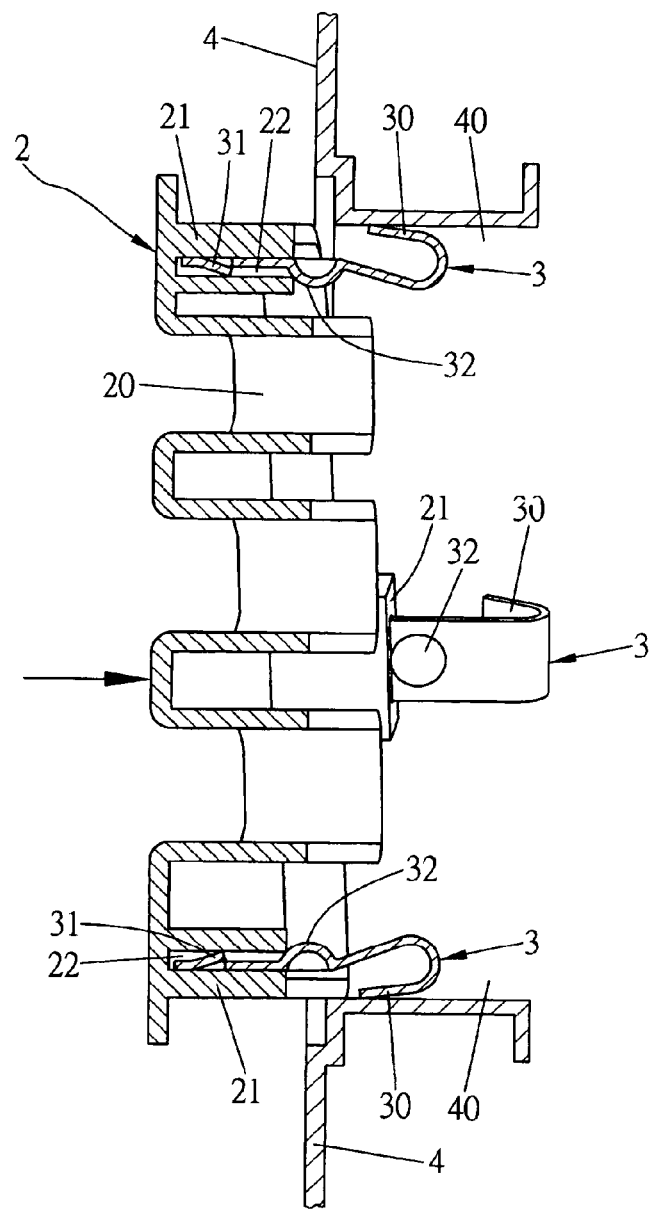
FIG. 5 is cross-sectional view of the preferred embodiment of a radiator grille of an automobile in the present invention, showing how it is installed in a car.
Figure 6:
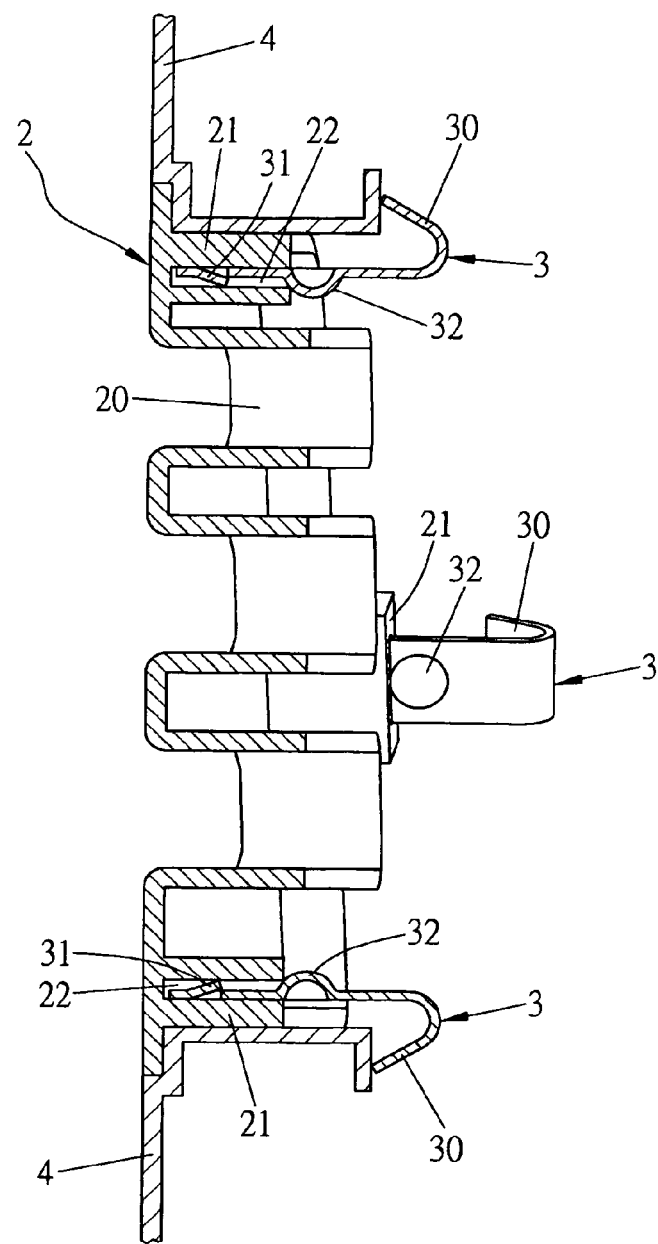
FIG. 6 is cross-sectional view of the preferred embodiment of a radiator grille of an automobile in the present invention, showing it being completely installed in a car.

In using, as shown in FIGS. 5 and 6, the grille body 2 is primarily put into an opening 40 of a car body 4, with the locking portions 30 of the hooking members 3 oppressed inwards by an inner wall of the opening 40. As the hooking members 3 are made of elastic metal, the free ends of the hooking members 3 are to slightly incline to one side when the locking portions 30 are oppressed inwards, as shown in FIG. 5. As soon as the grille body 2 is totally installed inside the car body 4, the hooking members 3 are no longer oppressed by the inner wall of the opening 40 so that they and their locking portions 30 are elastically recovered to be assuredly positioned on the part of a car body 4 located in front of a radiator, as shown in FIG. 6. Therefore, with the hooking members 3 made of metal to possess a strong strength and elasticity, they are not to be easily broken owing to improper handling while being assembled with the grille body 2. Moreover, the radiator grille can not only be conveniently and swiftly assembled, but also firmly positioned in a car.

While the preferred embodiment of the invention has been described above, it will be recognized and understood that various modifications may be made therein and the appended claims are intended to cover all such modifications that may fall within the spirit and scope of the invention.

What is claimed is:

1. A radiator grille of an automobile installed at a front end of an automobile for heat radiating of an engine; comprising:

a grille body provided with plural air vent (20); plural positioning bases (21) located on an inside thereof, each positioning base (21) having a plugging groove (22);

a plurality of hooking members (3), each hooking member being made of metal, provided with a locking portion (30) formed at one end, an elastic blocking portion (31) obliquely pressed outward, and a hunched positioning portion (32) protruding outwards as well; the hunched positioning portion (32) being a round concave recess protruding from a middle portion of the hooking member (30);

wherein in assembling, the hooking members (3) arc first respectively inserted into the plugging grooves (22) of the grille body (2), with the blocking portion (31) elastically squeezing on an inner wall of the plugging groove (22) and the hunched positioning portion (32) leaning on a top of the positioning base (21); the hooking members (3) are thus fixedly positioned with the positioning bases (21) of the grille body (2), finishing the assembly of the radiator grille.

* * * * *